S. D. FIELD.
MULTIPLEX TELEGRAPH APPARATUS.
APPLICATION FILED MAR. 25, 1910.

975,756.

Patented Nov. 15, 1910.

2 SHEETS—SHEET 1.

S. D. FIELD.
MULTIPLEX TELEGRAPH APPARATUS.
APPLICATION FILED MAR. 25, 1910.
975,756.
Patented Nov. 15, 1910.
2 SHEETS—SHEET 2.
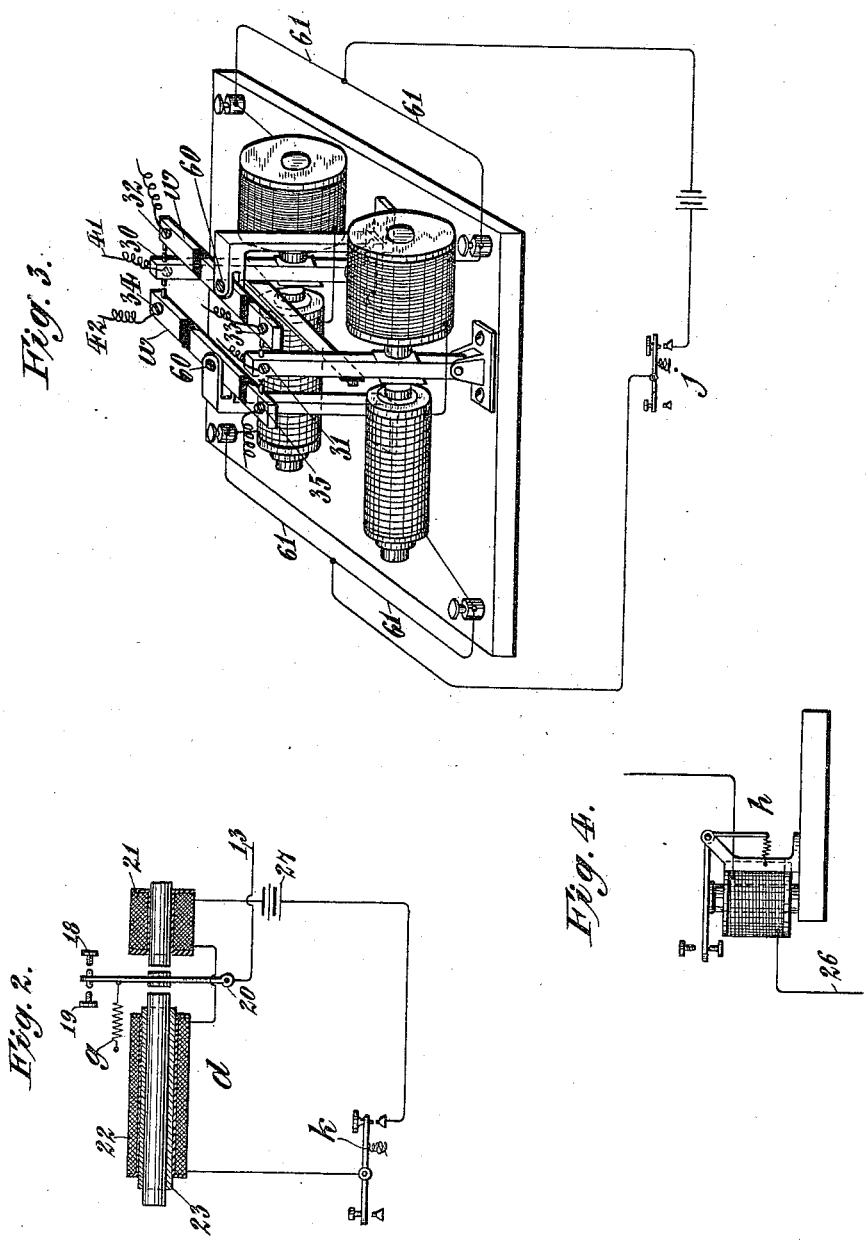

UNITED STATES PATENT OFFICE.

STEPHEN DUDLEY FIELD, OF STOCKBRIDGE, MASSACHUSETTS.

MULTIPLEX-TELEGRAPH APPARATUS.

975,756. Specification of Letters Patent. Patented Nov. 15, 1910.

Application filed March 25, 1910. Serial No. 551,429.

*To all whom it may concern:*

Be it known that I, STEPHEN DUDLEY FIELD, a citizen of the United States, residing in the town of Stockbridge, in the county of Berkshire and State of Massachusetts, have invented a new and useful Multiplex-Telegraph Apparatus, of which the following is a specification.

This invention relates to multiplex telegraphs and more particularly to quadruplex telegraphs in which two messages are sent simultaneously in one direction to a distant station, on a single circuit, while two messages are received simultaneously from said distant station.

The objects of this invention are to obviate the necessity for the use of an artificial resistance in the transmitter branch; to provide for informing the transmitting operator of the character of the transmitted signals at a point in the circuit between the transmitter and the main line; to provide for bridging the interval of no current incident to a reversal of the battery and apparent in the neutral relay; to provide for locating the transmitter which varies the strength of current in both the main and artificial lines at a point between the connection with the transmitter branch and the receiving relays; and to provide means whereby the transmitter operating magnets operate on both the up and the down stroke with equal force so that the movements of the lever to make the space between the elemental parts of a letter or character is produced by the same force which produces the dot or dash; this obviates the use of a spring retractor. To attain these objects a lamp of high resistance is placed in each of the leads from the dynamo to the transmitter, and these lamps are normally cut out of circuit by a fusible section of conductor of low current carrying capacity or any other known automatic circuit interrupting device of negligible resistance may be used. There is a Hughes magnet in a branch circuit, in series with a condenser, connected to the transmitter branch at or about its junction with the main and artificial lines; this branch is grounded. The receiving relays are preferably differentially wound, and the neutral relay is provided with a supplemental holding coil connected in series with a condenser in a branch circuit, the opposite terminals of which are connected to the main and artificial lines at a point between the transmitter and the neutral relay. The receiving relays are arranged to receive one set of signals due to current reversals and one set of signals due to variations in current strength. The transmitters are the ordinary pole changing transmitters and the "shunt and leak transmitter" characteristic of what is well known in the art as "the Field key system." In this improved arrangement this shunt and leak transmitter is duplicated at each station or it may be said to be in two identical sections, one complete section being in the main line, the other complete section in the artificial line, both at corresponding points in the main and artificial lines, between the point of connection of the transmitter branch and the receiving instruments; this places the artificial resistances forming part of the key system in the main and artificial lines, and the static discharge resulting from a current impulse of charge flows back and is thus made effective in the branch circuit containing the extra coil on the neutral relay. Stated more specifically, the extra currents from relays $a$ and $b$ act in conjunction with the static charge from line at the time of magnetic charge to charge condenser 28 and actuate coil $e$ on neutral relay $b$; said current is directed through branch 12 by the presence of resistances $r$ and $s$.

A special device is provided whereby the contact points of the two sections of the current varying transmitter are caused to engage at exactly the same time. This consists of a special pivoted lever retained in set position by friction at the pivotal point of support; at opposite ends of this pivoted lever is fixed one contact of each transmitter section; the complementary contacts are mechanically united and carried by the armature levers of the magnet or magnets forming part of the transmitter. This pivoted lever resembles a whiffle-tree, as used in a single vehicle; the first engagement of the contacts sets the whiffle-tree lever in position so that thereafter the engagement of the two pairs of contacts occurs at identically the same time.

The transmitter levers are operated in both directions by electro-magnetism, and a spring or gravity retractor is avoided. Heretofore where retractile springs have been applied to the armature they have given rise to inequalities.

The space in Morse signals should be made in the same time and by the same agency as the dot or dash in order to obtain uniform and exact signals. My improvements provide for this and render the transmitter magnets self-adjusting, so that they can be changed from a local circuit into a city line or short line circuit without changing any springs or in any way changing the retractile force, no matter what variation in the current strength or polarity there may be. The improved arrangement consists in the employment of two electro-magnets located on opposite sides of the pivoted transmitter lever; the coils of these magnets are in a local circuit in series with the manually operated key; both magnets have the same ampere turns, but one magnetizes and demagnetizes more rapidly than the other; the magnet to produce the down stroke of the transmitter lever has a short core and charges and discharges quickly. The magnet on the opposite side retracts the armature lever and is slow acting; it has a long core and this core is in a copper tube. When the circuit is closed, the quick acting magnet draws the armature out of the field of the slow acting magnet to produce the down stroke of the transmitter lever, and when the manually operated key is opened, the quick acting magnet discharges while the slow acting magnet holds its magnetism long enough to retract the armature lever with a firm and solid contact.

The accompanying drawings illustrate the invention.

Figure 1 is a complete schematic view of the apparatus at one station. Fig. 2 is a cross-section of the transmitter magnets and local circuit. Fig. 3 shows the current varying transmitter, and Fig. 4 shows the Hughes magnet operating a sounder in a branch line.

Two transmissions and two sets of signals are due to variations in polarity and to variations in the strength of the current, respectively. There is the main line 10, and the artificial line 11, with a transmitter branch 13, connected with the main and artificial line at 14. In the artificial line there is an adjustable resistance 15, and a capacity 29; this is to compensate for existing conditions in the natural line 10. The pole changing transmitter $d$ is in the transmitter branch 13; a grounded dynamo 16, of one polarity is connected to the contact 18, and a grounded dynamo 17, of the opposite polarity is connected to contact 19. The transmitter branch 13, is connected to the vibrating armature contact 20. The contact 20 is attracted and retracted by electro-magnetism. This is done to produce an armature pull in each direction of the same force or strength. 21 is a short core quick-acting magnet. 22 is a long core slow-acting magnet having its core covered with a copper jacket 23, to retard the magnetic charge and discharge. I prefer to wind magnet 22 with insulated wire of No. 24 gage and magnet 21 with insulated wire of No. 26 gage, but both magnets have the same ampere turns and operate on the common armature with the same pull; magnet 21, however, when key $k$ is closed, operates first and moves the armature out of the field of magnet 22, producing the so-called down stroke of the Morse alphabet on the contact 18. When the key $k$ is released to produce the up-stroke, that is, the space, the magnet 21 demagnetizes first and the magnet 22 demagnetizes more slowly, retracting the armature with exactly the same magnetic force with which magnet 21 attracted it. It results from this that the down-stroke and the up-stroke are made with the same force or pull, and the sending is more even and uniform as regards the character of the dots, dashes and spaces. It is to be understood that the magnets 21 and 22 are in a local circuit in series with key $k$ and local battery 27. It is usual to employ dynamos like 16, 17 of, say, 350 volts or more, and to guard against harmful short-circuits by including an artificial resistance in the branch connecting the dynamo with the fixed contacts of the transmitter. The use of this artificial resistance is avoided by reducing the electro-motive force of the dynamo to, say, 250 volts, and including a fusible section, 24, in the branch wire; this section is of low-fusing point and low-current carrying capacity. Its construction is well known. In this improved apparatus the fusible section is arranged as a shunt or cut-out around an incandescent lamp 25, of high resistance, so that in case of a short-circuit the fuse 24 melts and the lamp 25 glows to call attention to the changed conditions. For the purpose of enabling the transmitting operator to hear his own signals, a branch wire 26 is connected to the junction of the transmitting branch 13 with the main and artificial lines and in this branch a condenser 65 is in series with a sounder having a Hughes magnet $h$.

The polarized relay $a$ is of usual construction, with a coil in the main line 10 and a coil in the artificial line 11. The neutral relay $b$ is of usual construction with a coil in each line, as described with respect to the polar relay, but in this improved arrangement there is an extra coil $e$ acting upon the armature in the same sense as the main line coil. This coil $e$ is in a branch line 12, the terminals of which are connected with the main and artificial lines at a point between the receiving relay and the transmitter $c$ and in this branch line, in series, is a condenser 28, and said coil $e$. This coil $e$ is a holding coil to bridge the interval of no magnetism which occurs on reversal of main line current due to the operation of the transmitter *d* at the distant station. The function and utility of this coil will be described after describing the arrangement and construction of the current-varying transmitter *c*, by means of which the strength of current is increased and decreased. This transmitter in this improved arrangement has been located in the main and artificial lines and divided into two identical sections and means provided by which the contacts of each section engage simultaneously. The transmitter *c* is the well-known "shunt and leak" transmitter. It employs a resistance *r* of 1200 ohms; a resistance *s* in series of 600 ohms; a resistance *t* in a grounded branch 40, of 900 ohms. The resistance *t* in the grounded branch 40 is connected to the transmitter contact 32. The transmitter contact 30 is connected to a branch wire 41, the opposite terminal of which is connected to the main-line side of the resistance *r*. The back contact 34 of transmitter *c* is connected to one terminal of a branch line 42, the opposite terminal of which is connected to line between the resistances *r* and *s*. It results from this that when the transmitter lever is in one position the strength of current is at its maximum and when said lever is in its opposite position the strength of current is at a minimum, while the continuity of the circuit is never interrupted. This transmitter is duplicated and located in the artificial line, the other duplicate section being located in the main line. Means are provided for operating both sections by means of a local circuit so that both contacts on the down stroke are absolutely simultaneous and the contacts on the up stroke are exactly simultaneous. To accomplish this I locate the down-contacts, 32, 33, at opposite ends of a pivoted lever *w*, which is supported midway its ends on a frictional bearing 60, so that it will retain any position in which it is set by engagement with the moving transmitting lever. The back or up contacts 34, 35, of both transmitter sections are located at the ends of a similar pivoted lever having a central frictional bearing 60. The armature levers of the two sections of the transmitter are mechanically united and insulated from each other. The magnets are included in a local circuit with a manually operated transmitting key *j*. These magnets are constructed and arranged like the magnets of the transmitter *d*. It results from this arrangement of resistances *r*, *s*, and the branch line 12 that the holding coil *e* on the relay *b*, in series with the condenser 28, is enabled to hold the armature of relay *b* during the interval of no current due to reversal and no "bug trap" or spark eliminator is required. The operating magnets of transmitter *c*, shown in Fig. 3, are in multiple-arc branches of the local circuit 61 with a manual transmitting key *j*.

In both transmitters *c* and *d* the retractor is an electro-magnet and the success of the operation by such magnets is due to the difference in structure between the two magnets. It is found that a light spring *g* tending to draw the armature of transmitters *c* or *d* toward the retracting magnet prevents the armature from chattering at the contacts when the manual transmitting key is open. This renders the transmitter magnets self-adjusting and they can be readily changed from one circuit to another without regard to change in current conditions without readjustment.

I have shown in the drawings the apparatus at one station only; it is to be understood that the apparatus at the second station is an exact duplicate of that shown.

What I claim and desire to secure by Letters Patent is:

1. In a multiplex telegraph the combination of a main line connecting separated stations, two separate and independent receiving instruments at one station, a transmitter branch, means for rendering said receiving instruments irresponsive to outgoing signals, two identical transmitters, one in the main line, the other in the artificial line, and means for operating said transmitters simultaneously.

2. In a multiplex telegraph, the combination of receiving instruments at one station, receiving instruments at a second station, a main line connecting said stations, a transmitter branch at each station, means for rendering said receiving instruments irresponsive to outgoing signals, a self-adjusting transmitter in each transmitter branch, a pair of identical self-adjusting transmitters at each station and means for operating each pair of transmitters simultaneously.

3. In a multiplex telegraph, the combination of a polarized receiving instrument at each station, a neutral receiving instrument at each station, means for rendering said instruments irresponsive to outgoing current at each station including an artificial line; a transmitter branch at each station, a pole changer in each transmitter branch, and at each station a pair of current varying transmitters, one in the main line and one in the artificial line, and means for operating each pair of transmitters simultaneously.

4. In a multiplex telegraph, the combination at one station of a differential polarized relay, a differential neutral relay, an artificial line, a transmitter branch, a pole changing transmitter in said branch, a current varying transmitter in the artificial line, an identical current varying transmitter in the main line, and means for operating the last named transmitters simultaneously.

5. In a multiple telegraph the combination of a main line, an artificial line, suitable balanced receiving instruments and a self-adjusting transmitter consisting of a pivoted armature bar, a quick-acting magnet, and a slow-acting magnet arranged to move said lever in opposite directions respectively, and a suitable circuit including said magnets.

6. In a multiplex telegraph the combination with suitable receiving instruments and suitable transmitting instruments at each station, of a main line connecting said stations, an artificial line at each station, and a pair of substantially identical transmitters at each station, one located in the main line, the other located in the artificial line, and means for operating each pair of transmitters simultaneously.

7. In a multiplex telegraph, the combination, with a main line, of suitable receiving instruments at each station, suitable transmitting instruments at each station, an artificial line at each station, and at one station a transmitter in the main line, a duplicate transmitter in the artificial line, and means for operating said transmitters simultaneously.

8. In a multiplex telegraph the combination with a main line of suitable receiving instruments at each station, suitable transmitting instruments at each station, an artificial line at each station, and at one station a transmitter in the main line, a duplicate transmitter in the artificial line, and means for closing the contact points of said transmitters simultaneously.

9. In a multiplex telegraph, the combination, at each station, with the main line, of a transmitter branch and an artificial line; a differential receiving instrument, a pair of transmitters one in the main line, the other in the artificial line, and means for closing the contact points of said transmitters simultaneously.

10. In a multiplex telegraph, the combination, with the main line, at each station, of a transmitter branch and an artificial line; a differential receiving instrument, and a transmitter in two duplicate sections, one operating in the main line, the other operating in the artificial line, and means for producing identity of operation of the contact points of said transmitter sections.

11. In a multiplex telegraph, the combination, with suitable receiving instruments and suitable transmitting instruments, at each station, of a main line uniting said stations, an artificial line at each station, and a transmitter at one station composed of two identical sections, one in the main line, the other in the artificial line, and means for producing simultaneous engagement of the contact points of both said sections.

12. The combination, in a multiplex telegraph, of a main line uniting separated sections, suitable receiving and transmitting instruments at each station, and a transmitter at one station having two identical sections, one section located in the main line, the other section in the artificial line, and means for producing simultaneous engagement of the contact points of both sections.

13. The combination, in a multiplex telegraph, of a main line uniting separated sections, suitable receiving and transmitting instruments at each station, with a transmitter at one station having two identical sections, one section located in the main line, the other section in the artificial line, and means for producing simultaneous engagement of the contact points of both sections, consisting of a pivoted lever actuated by the moving member of said transmitter, said lever having contact points and means for retaining a set position until positively moved.

14. In a multiplex telegraph the combination of a main line, a suitable receiving instrument, a suitable transmitting instrument, an artificial line, a transmitter branch, a receiving instrument, a condenser, a branch circuit, including said instrument and condenser in series, and connections for the terminals of said branch, whereby transmitted impulses are rendered apparent on said instrument at the transmitting station.

15. In a multiplex telegraph, the combination of a main line connecting separated stations, an artificial line at each station, a transmitter branch at each station, and a branch line connected to the transmitter branch, a condenser in said branch, and an electro-magnet in series with the condenser in said branch.

16. In a multiplex telegraph, the combination of a main line connecting separated stations, an artificial line at each station, a transmitter branch at each station, and a branch line connected to the transmitter branch, a condenser in said branch, and a polarized magnet in series with the condenser in said branch.

17. In a multiplex telegraph, the combination, with the main line, at each station, of an artificial line, a transmitter branch, a transmitter having a resistance in the main line, a resistance in the artificial line, a differential receiving instrument, a supplemental electro-magnet for said receiving instrument, a branch wire connecting the main and artificial lines at a point between said receiving instrument and said transmitter, and a condenser in said branch in series with the coil of said supplemental magnet.

18. In a multiplex telegraph, a main telegraph line in combination with suitable receiving and transmitting instruments at each station; an artificial line, a transmitter branch, a receiving instrument having a differential coil in the main and artificial lines, an extra coil, a branch circuit, including said coil and a condenser in series therewith, a transmitting device including a resistance in the main line and a resistance in the artificial line, the terminals of said branch line being connected to the main and artificial lines, respectively, between said receiving instrument and transmitter.

19. In a multiplex telegraph, a main line, an artificial line and a transmitter branch, with suitable receiving and transmitting instruments at each station, a transmitting device including a resistance in the main and artificial lines, a receiving instrument having coils in the main and artificial lines and an extra coil in a branch circuit connected to the main and artificial lines at points between said transmitting and receiving instruments, and a condenser in said branch in series with said coil.

20. In a multiplex telegraph, a main telegraph line, suitable receiving and transmitting instruments at each station, and a transmitter consisting of a lever operated by a circuit and two electro-magnets, one of said magnets being constructed to operate in advance of the other magnet, substantially as described.

21. In a multiplex telegraph, a main line in combination with suitable receiving and transmitting instruments including a transmitter composed of a pivoted lever, a short core quick-acting magnet arranged to move said lever in one direction, a long core slow-acting magnet arranged to move said lever in the opposite direction, and an electric circuit containing a circuit changing device and said magnets, substantially as described.

22. In a multiplex telegraph, a transmitter lever suitably pivoted and having suitable stops located on opposite sides thereof, a short core electro-magnet to move said lever in one direction, a long core magnet having a copper covering on the core to move said lever in the opposite direction, both said magnets having coils with substantially the same ampere turns and a circuit containing said coils and a manually operated circuit controller.

23. In a multiple telegraph the combination of a main line, an artificial line, suitable balanced receiving instruments, and a self-adjusting transmitter consisting of a pivoted armature bar, a quick-acting magnet, and a slow-acting magnet arranged to move said lever in opposite directions respectively, a suitable circuit including said magnets, and means for retaining said armature bar at rest during no-current intervals.

24. In a multiple telegraph the combination of a main line, an artificial line, suitable balanced receiving instruments and a self-adjusting transmitter consisting of a pivoted armature bar, a quick-acting magnet and a slow-acting magnet, arranged to move said levers in opposite directions respectively, a suitable circuit including said magnets and a spring for retaining said armature bar at rest during no-current intervals.

STEPHEN DUDLEY FIELD.

Witnesses:
GEO. SEYMOUR,
ADAM SCHILLING.